(12) United States Patent
Shibukawa et al.

(10) Patent No.: US 7,528,517 B2
(45) Date of Patent: May 5, 2009

(54) DISTRIBUTION OF MOTOR HEAT SOURCES

(75) Inventors: Yuichi Shibukawa, Yokosuka (JP); Yutaro Kaneko, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 334 days.

(21) Appl. No.: 11/449,147

(22) Filed: Jun. 8, 2006

(65) Prior Publication Data
US 2006/0279156 A1 Dec. 14, 2006

(30) Foreign Application Priority Data
Jun. 9, 2005 (JP) ............................. 2005-169588

(51) Int. Cl.
*H02K 17/00* (2006.01)

(52) U.S. Cl. .................................................. 310/208

(58) Field of Classification Search ............... 310/71, 310/268, 208, 179, 180
See application file for complete search history.

(56) References Cited

U.S. PATENT DOCUMENTS 5,420,782 A * 5/1995 Luce et al. .................. 363/109
7,221,073 B2 * 5/2007 Yamada et al. .............. 310/218

FOREIGN PATENT DOCUMENTS

JP 2004-282989 10/2004

* cited by examiner

*Primary Examiner*—Javaid Nasri
(74) *Attorney, Agent, or Firm*—Global IP Counselors, LLP

(57) ABSTRACT

The disclosure is directed to an electrical motor that includes a rotor and stator with improved cooling of the motor. The improved cooling is due to a convenient coil connecting structure of the stator. Outer and inner peripheral connectors connect the coil wound ends at the outer and inner peripheral sides of the stator, respectively. From this structure, heat sources, such as the connectors, are distributed to both the outer peripheral and inner peripheral sides of the stator core. In this manner, the motor may more effectively be cooled through the distributed heat sources.

13 Claims, 8 Drawing Sheets

DISTRIBUTION OF MOTOR HEAT SOURCES

This application claims priority to Japanese Patent Application No. 2005-169588, filed Jun. 9, 2005, the entire content of which is incorporated herein by reference.

TECHNICAL FIELD

The invention relates to electric motors.

BACKGROUND

Conventionally, a 3-phase motor has coil windings of a U phase coil, a V phase coil, and a W phase coil. Each coil winding of the U phase coil, V phase coil, and W phase coil of a 3-phase motor has a multiplicity of turns, and is connected to the wound final end by the outer peripheral side or the inner peripheral side of the stator core. The turns of the coil are connected by the outer side outer connector of the coil or the inner side inner connector of the coil in common with the neutral line to which each coil end is connected.

SUMMARY

The disclosure is directed to an electrical motor that includes a rotor and stator with improved cooling of the motor. The improved cooling is due to a convenient coil connecting structure of the stator. Outer and inner peripheral connectors connect the coil wound ends at the outer and inner peripheral sides of the stator, respectively.

For conventional technology, there is placement of the connectors on only the outer peripheral side of the stator core or the inner peripheral side. The connectors become concentrated on one side of the outer peripheral or inner peripheral side of the stator.

In one embodiment, the invention is directed to a motor that includes a rotor having a plurality of permanent magnets and a stator opposed to the rotor that includes a plurality of stator cores formed in an annulus. The motor also includes a coil that includes outer peripheral coil wound ends disposed on an outer peripheral side of the plurality of stator cores and inner peripheral wound ends on an inner peripheral side of the plurality of stator cores. Additionally, the motor includes a plurality of outer peripheral connectors that connect the outer peripheral coil wound ends via the outer peripheral side of the plurality of stator cores and a plurality of inner peripheral connectors that connect the inner peripheral coil wound ends via the outer peripheral side of the plurality of stator cores.

In another embodiment, the invention is directed to a motor including a rotor comprising a plurality of permanent magnets and means for conducting an electrical current around a plurality of stator cores adjacent to a periphery of a stator, wherein the means for conducting an electrical current comprises outer peripheral coil wound ends disposed on an outer peripheral side of the plurality of stator cores and inner peripheral wound ends on an inner peripheral side of the plurality of stator cores. The motor also includes means for connecting the outer peripheral coil wound ends at an outer peripheral side of the plurality of stator cores and means for connecting the inner peripheral coil wound ends at an inner peripheral side of the plurality of stator cores.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
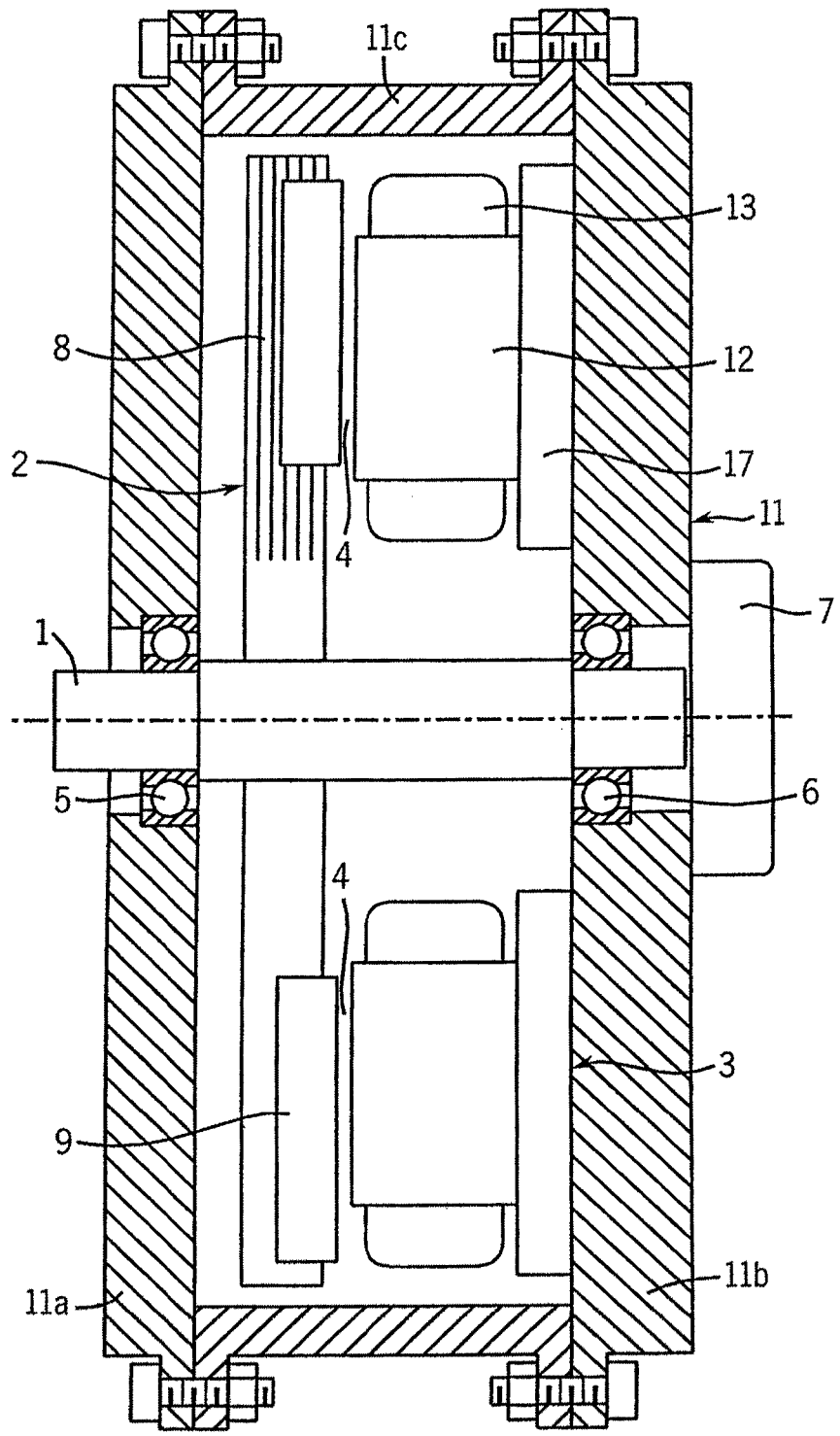
FIG. 1 is a cross-sectional view which shows an axial gap type motor whose connection structure is appropriate for this invention.

FIG. 1 is a cross-sectional view which shows an axial gap type motor wherein the coil connection structure of this invention is appropriate. The axial gap type motor provides a rotary axis 1, a rotor 2, a stator 3, and a motor case 11. Motor case 11 is formed from a front side case 11a, a rear side case 11b, and from an outer case 11c which is bolt joined to both side cases 11a and 11b.

The rotary axis 1 is rotatably supported by the first bearing 5 which is established on the front side case 11a and the second bearing 6 which is established on the rear side case 11b. In addition, a rotary sensor 7, which detects the axis rotation count, is established on the rear end of the rotary axis 1.

Rotor 2 is fixed to rotating axis 1, and has a plurality of permanent magnets 9 inserted at the facing surface with stator 3. The permanent magnets 9 are disposed along the direction of the circumference of the rotor 2. The permanent magnets 9 generate a repelling force and attractive force to the rotating magnetic flux which is imparted from the stator 3. So as to rotate the rotary axis 1 at the center, rotor 2 is formed with a rotor base 8 by an electromagnetic steel plate (strong magnetic metal).

The plurality of permanent magnets 9 are arranged so that adjacent surface magnetic poles (N pole, S pole) are alternately different. Between the rotor 2 and stator 3 a gap exists which is called the air gap, with no mutual contacts.

Stator 3 is fixed to the rear side case 11b, and is formed by the stator core which provides the tooth 12 and the coil 13, or means for conducting an electrical current, and by the back yoke 17. The above-mentioned coil winding 13 is wound on the tooth 12 by the insulator (not illustrated). In addition, the stator 3 is maintained by the rear side case 11b by means of this back yoke 17.

Figure 2:
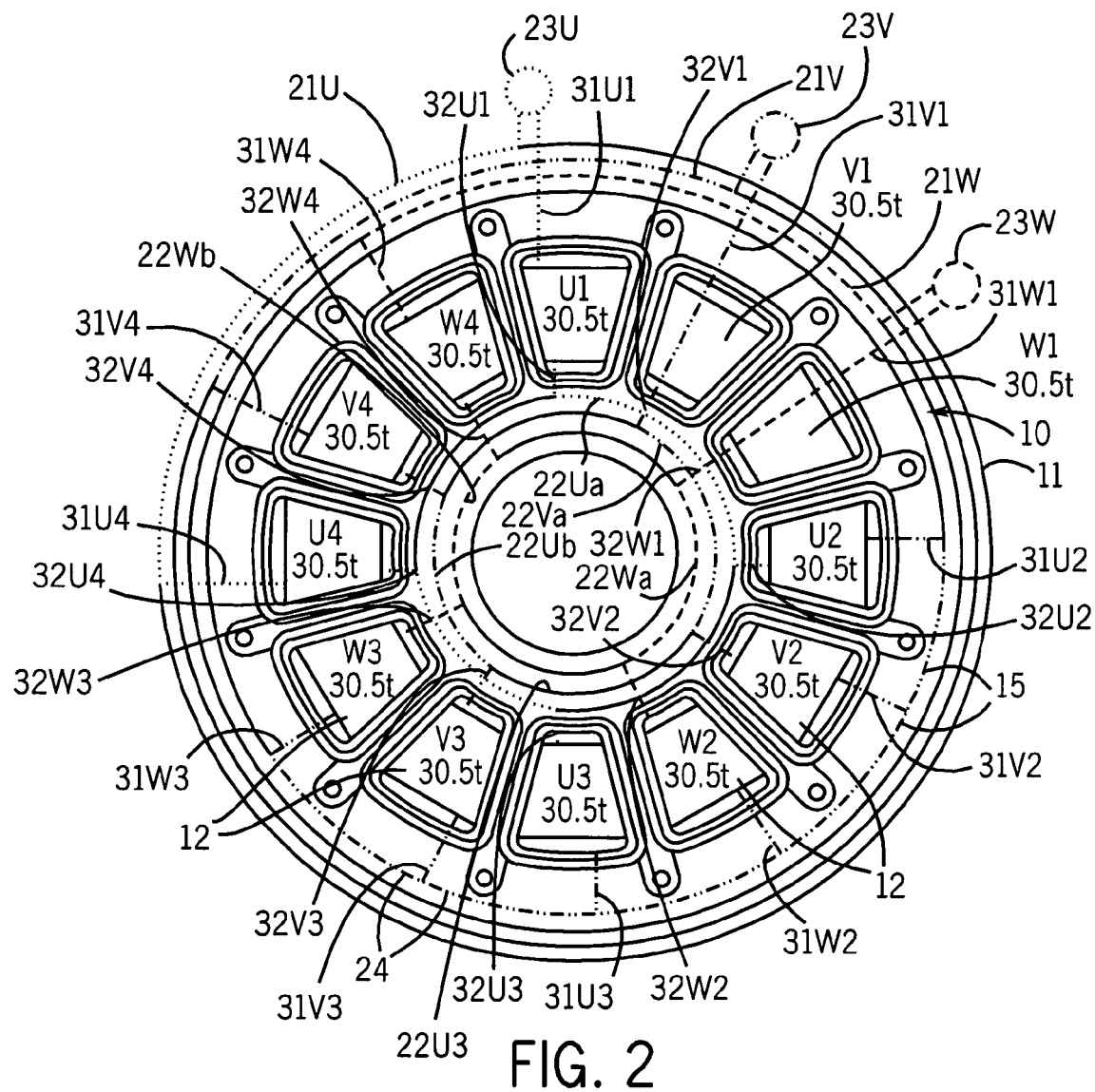
FIG. 2 is an example diagram of the coil connection structure of Embodiment 1 of this invention.

FIG. 2 is an explanation diagram of the coil connections structure of the motor of Embodiment 1. As shown in FIG. 2, the stator core 10 is formed as an annulus on the periphery of the rotating axis (not illustrated) and has a plurality of coils 13 in the peripheral direction along this annulus. This plurality of coils is arranged at approximately equal intervals in the peripheral direction. The coils are formed by winding coil wire (wire) for every phase by means of an insulator (not illustrated) on the boundary of every tooth 12, which projects in the direction of the stator (not illustrated).

The plurality of coils 13 have 3-phase coils, and provide respectively 4 coils per phase as in the U phase coil (U1~U4), the V phase coil (V1~V4), and the W phase coil (W1~W4). Each coil of the U phase, V phase, and W phase has outer peripheral coil wound ends 31u1~31u4, 31v1~31v4, and 31w1~31w4 on the outer peripheral side of the stator core 10. For the inner peripheral side, there are the inner peripheral coil wound ends 32u1~32u4, 32v1~32v4, and 32w1~32w4 on the inner peripheral side of the stator 10.

The outer peripheral coil wound ends 31u1, 31u4, 31v1, 31v4, 31w1, and 31w4 are connected by the outer peripheral connectors 21u, 21v, and 21w, or means for connecting the outer peripheral coil wound ends, which are arranged on the outer peripheral side of the stator core 10. The remaining outer peripheral coil wound end parts 31u2, 31u3, 31v2, 31v3, 31w2, and 31w3 are connected by the outer peripheral connector 24. This outer peripheral connector 24 combines with the neutral wire.

The inner peripheral coil wound ends 32u1, 32u2, 32v1, 32v2, 32w1, and 32w2 are connected by the inner peripheral connectors 22ua, 22va, and 22wa, or means for connecting the inner peripheral coil wound ends, which are arranged on the inner peripheral side of the stator core 10. The remaining inner peripheral coil wound ends 32u3, 32u4, 32v3, 32v4, 32w3, and 32w4 are connected by the inner peripheral connectors 22ub, 22vb, and 22wb, which are arranged on the inner peripheral side of the stator core 10.

From this construction, each respective coil of the U phase, V phase, and W phase is serially connected. In this embodiment, there is assumed a structure produced from the outside by the establishment of the outside produced parts 23u, 23v, and 23w by the outer peripheral connectors 21u, 21v, and 21w.

Figure 3:
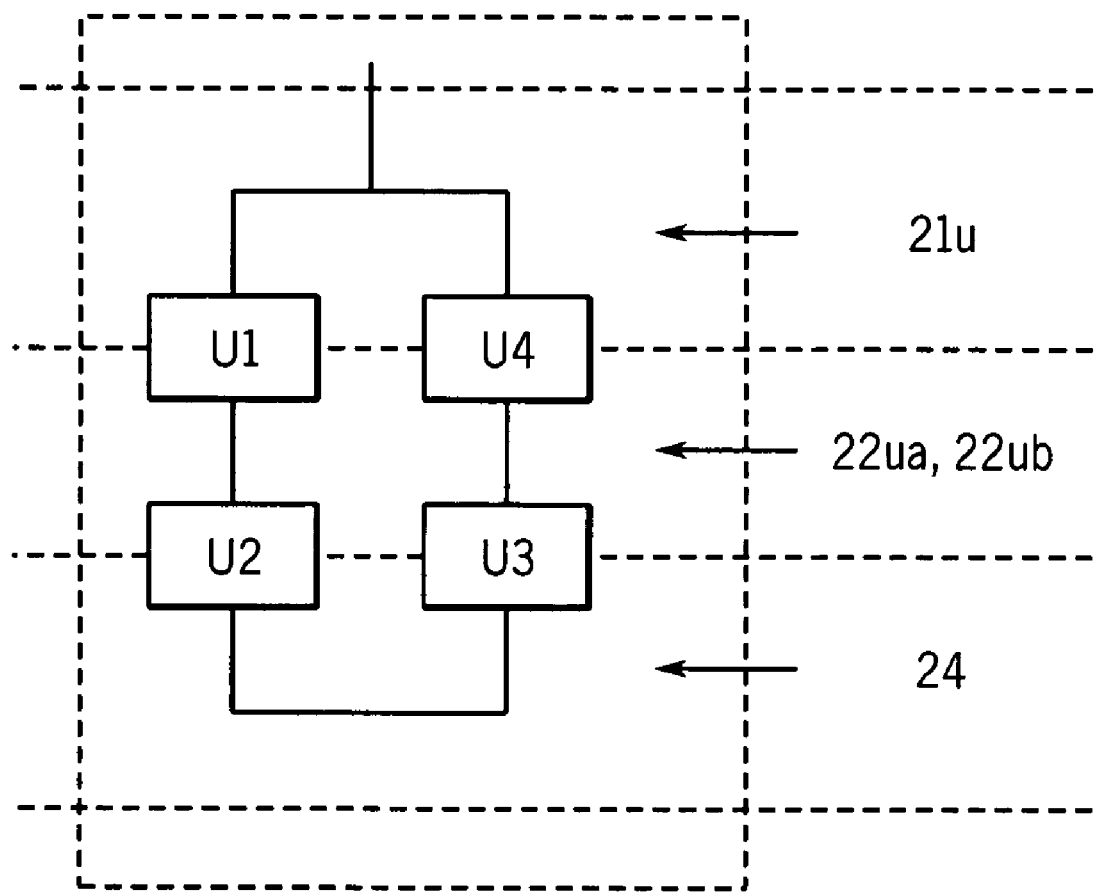
FIG. 3 is an example diagram of the connection sequence of the coil connection structure of FIG. 2.

FIG. 3 is an explanation diagram of the connection sequence for the series connections of FIG. 2. As shown in FIG. 3, for the U phase coil, there is passage through the inner peripheral side from coil U1 to coil U2 (inner peripheral connector 22ua), and passage through the outer peripheral side (outer peripheral connector 24) from coil U2 to coil U3, and passage through the inner peripheral side (inner peripheral connector 22ub) from coil U3 to coil U4, and passage through the outer peripheral side (outer peripheral connector 21u) for from coil U4 to coil U1. All these passages are respectively connected. Thus, when serially connected, for every phase, there is alternately an outer peripheral connector and an inner peripheral connector.

Because the outer peripheral connectors 21u, 21v, 21w, and 24 and the inner peripheral connectors 22u, 22v, and 22w, which are heat sources, do not concentrate in one direction by distributing to the outer peripheral side and the inner peripheral side of the stator 10, there is no great heat generated only on one side of either the outer peripheral side or the inner peripheral side of the stator core 10. Accordingly, it is possible to improve the cooling of the motor.

In addition, by having serial connections which serially connect alternately using outer peripheral connector and inner peripheral connectors, it is possible to arrange evenly the overlapping count of busbars. It is possible also for the turns of the coil winding to be made the same (30.5 t) using all of the U phase coils (U1~U4), V phase coils (V1~V4), and the W phase coils (W1~W4).

Figure 8A:
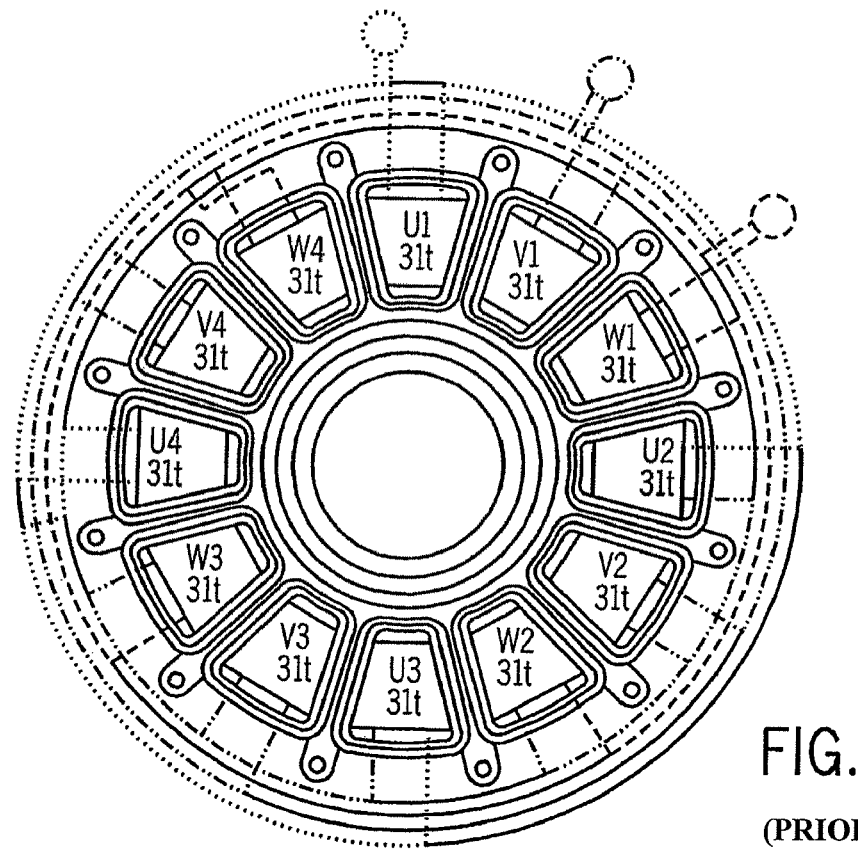
FIG. 8 illustrates the coil connection structure of a conventional 3-phase motor with (a) an example diagram of the outer peripheral connections and (b) an example diagram of the inner peripheral connections.
Figure 8B:
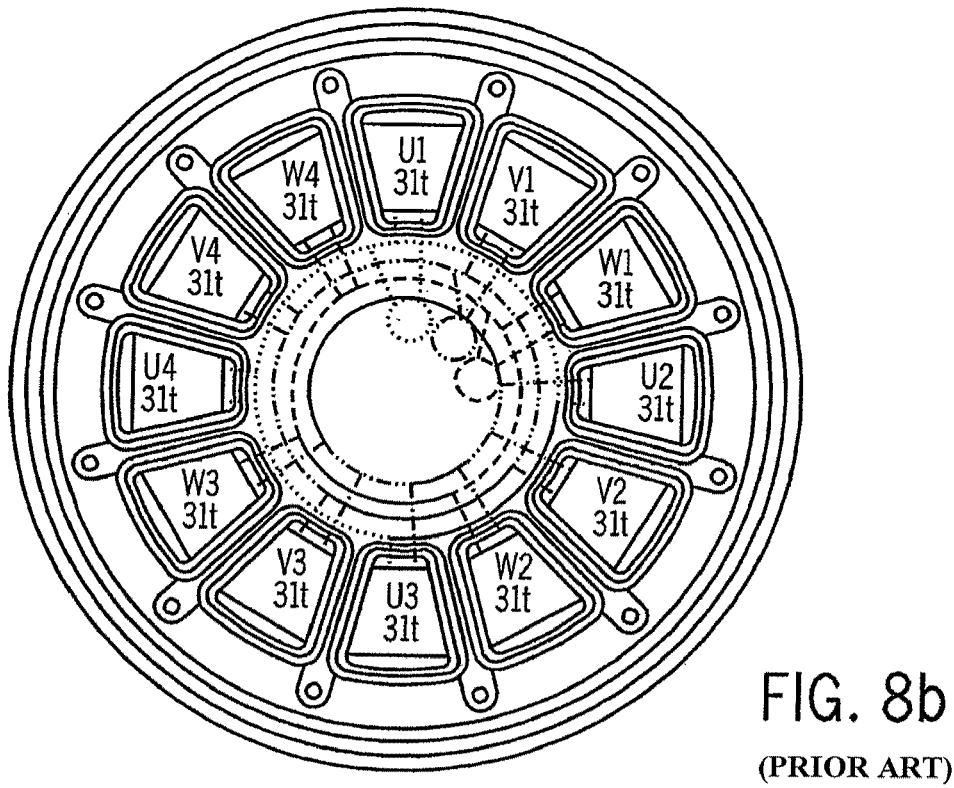

However, as shown in FIG. 8, when there are connections only by the outer peripheral connectors or the inner peripheral connectors, the overlapping count of the busbars reaches a maximum of 4. Because the heat sources in these parts are concentrated, the connectors become locally heated to a high degree. By alternately serially connecting, using the outer peripheral connectors and the inner peripheral connectors, as shown in FIG. 2, it is possible to curtail the maximum of the overlapping count of the busbars to 3. It is then possible to control the locally high heat that the connectors experience. Thus, it is possible to improve the motor's cooling performance.

Additionally, as shown in FIG. 8(a), when there is connection only with the inner peripheral connector, because the take-out part is located on the inner peripheral side of the stator core, when there is wiring from this take-out part to outside the motor's case, there is the necessity of locating the wires (take-out line) in the radial direction of the motor. This part of the motor becomes long in the axial direction, but as shown in FIG. 2, by establishing take-out parts 23u, 23v, and 23w at the outer peripheral connectors 21u, 21v, and 21w, because it is possible to wire directly to the outside of the motor from the outer peripheral of the stator core, it is possible to prevent a lengthening of the motor in the axial direction.

Figure 4:
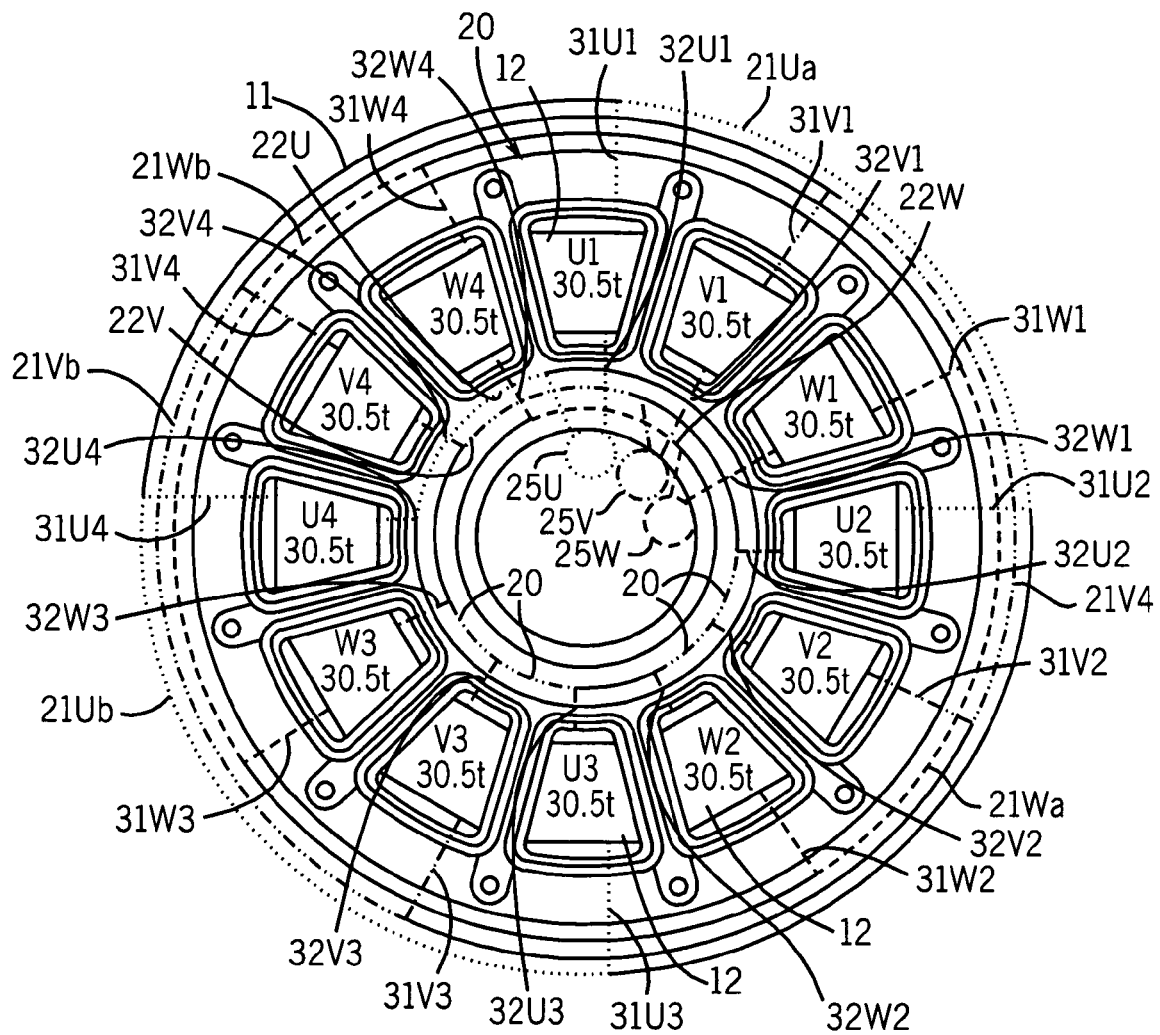
FIG. 4 is an example diagram of the coil connection structure of Embodiment 2 of this invention.

FIG. 4 is an explanation diagram of the coil connection structure of the motor of Embodiment 2. In this embodiment, as shown in FIG. 4, there is an inner peripheral take-out structure which establishes inner peripheral take-out parts 25u, 25v, and 25w at the inner peripheral connectors 22u, 22v, and 22w.

Every coil of the U phase, V phase and W phase has inner peripheral coil wound ends 32u1~32u4, 32v1~32v4, and 32w1~32w4 on the inner periphery of the stator core 20, and outer peripheral coil wound ends 31u1~31u4, 31v1~31v4, and 31w1~31w4 on the outer periphery of the stator core 20.

The inner peripheral coil wound ends 32u1, 32u4, 32v1, 32v4, 32w1, and 32w4 are connected by the inner peripheral connectors 22u, 22v, and 22w. The remaining inner peripheral coil wound ends 32u2, 32u3, 32v2, 32v3, 32w2, 32w3 are connected by the inner peripheral connector 26. This inner peripheral connector combines with the neutral line 26.

The outer peripheral coil wound ends 31u1, 31u2, 31v1, 31v2, 31w1, and 31w2 are connected by the outer peripheral connectors 21ua, 21va, 21wa. The remaining outer peripheral coil wound ends 31u3, 31u4, 31v3, 31v4, 31w3, and 31w4 are connected by 21ub, 21vb, and 21wb. From this arrangement, each coil, for respectively the U phase, V phase, and W phase, is serially connected.

Figure 5:
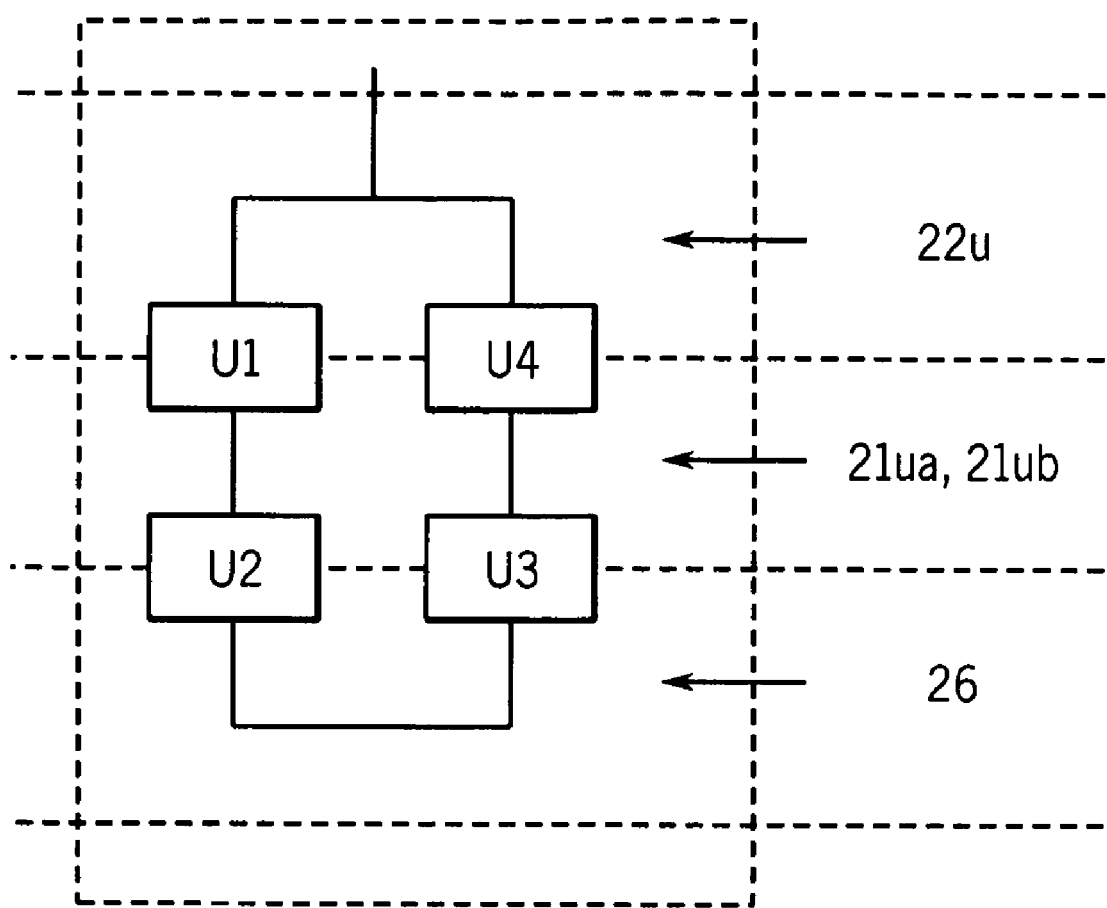
FIG. 5 is an example diagram of the connection sequence of the coil connection structure of FIG. 4.

FIG. 5 is an explanation diagram of the wire connections sequence when there are the serial connections of FIG. 4. As shown in FIG. 5, when it is the case of the U phase coil, there are respective connections by passage through the outer peripheral side (outer peripheral connector 21ua) from coil U1 to coil U2, there is a passage through the inner peripheral side (inner peripheral connector 26) from coil U2 to coil U3, there is passage through the outer (outer peripheral connector 21ub) peripheral side from coil U3 to coil U4, and there is passage through the inner peripheral side from coil U4 to coil U1 (inner peripheral connector 22u). Thus, when serially connected, for every phase, there is alternation between the inner peripheral connectors and the outer peripheral connectors.

Because the inner peripheral connectors 22u, 22v, 22w, and 26 and the outer peripheral connectors 21u, 21v, and 21w, which are heat sources, are not concentrated in one direction by distribution to the inner peripheral side and outer peripheral side of the stator core 10, there is no high heat concentration only in one direction of the inner peripheral side or the outer peripheral side of the stator core 20. Thus, there can be improvement in the cooling of the motor.

In addition, by having serial connectors which connect in series using alternately the inner peripheral connector and the outer peripheral connector, it is possible to arrange the overlapping count of busbars evenly. It is possible also for the turns of the coil winding to be made the same (30.5 t) using all of the U phase coils (U1~U4), V phase coils (V1~V4), and the W phase coils (W1~W4).

However, as shown in FIG. 8, when there are connections only by the outer peripheral connectors or the inner peripheral connectors, the overlapping count of the busbars reaches a maximum of 4. Because the heat sources in these parts are concentrated, the connectors become locally greatly heated. By alternately serially connecting, using the outer peripheral connectors and the inner peripheral connectors, as shown in FIG. 4, it is possible to curtail the maximum of the overlapping count of the busbars to three counts. It is then possible to control, or reduce, the locally high heat concentration that the connectors experience. Therefore, it is possible to improve the motor's cooling with this configuration.

Figure 6:
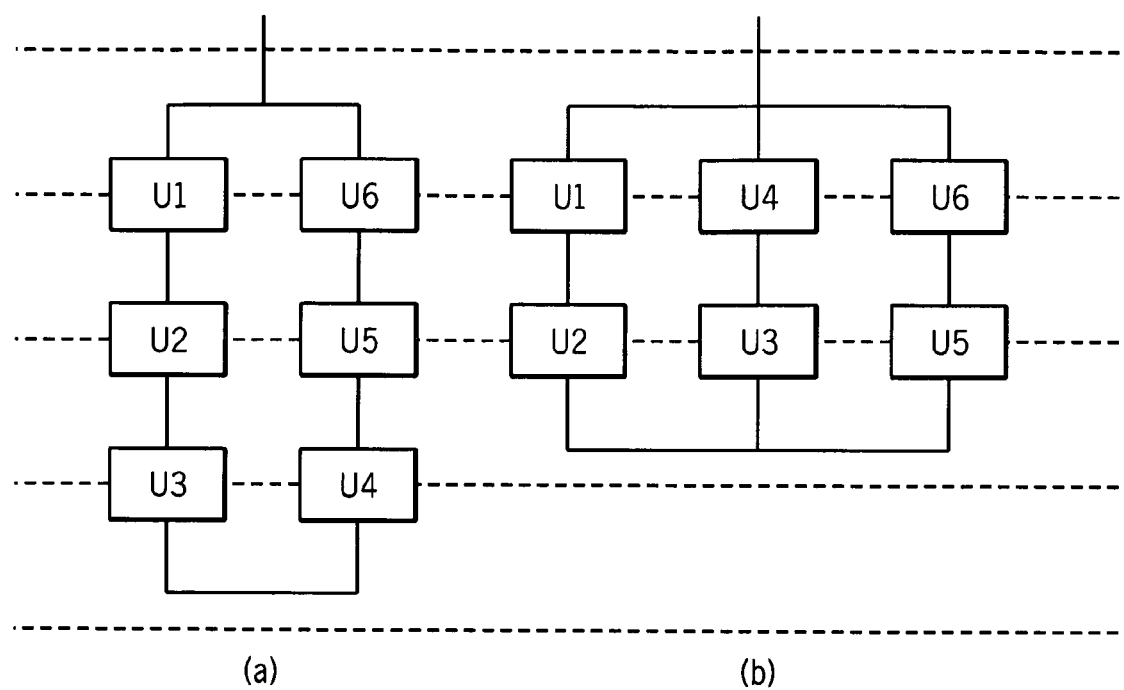
FIG. 6 is an example diagram of the connection sequence of the coil connection structures of Embodiments 3 and 4.

FIG. 6 is an explanation diagram of the wire connection sequence of the coil connection sequence of Embodiments 3 and 4. As shown in FIG. 6, also when there are established respectively 6 coils for the U phase, V phase, and W phase, there is alternate repetition of the sequence of the connecting parts, the outer peripheral side and the inner peripheral side as in the outer peripheral connectors→inner peripheral connectors or the inner peripheral connectors→outer peripheral connectors.

For example, the connection sequence for the U phase coil (U1~U6) is as follows. When it is the case of serial connections from coil UI to coil U6, as shown in FIG. 6(a), there are respective connections through a sequence through the inner peripheral side (inner peripheral connector) from coil U1 to coil U2, through the outer peripheral side (outer peripheral connector) from coil U2 to coil U3, through the inner peripheral side (inner peripheral connector) from coil U3 to coil U4, through the outer peripheral side (outer peripheral connector) from coil U4 to coil U5, through the inner peripheral side (inner peripheral connector) from coil U5 to coil U6, and through the outer peripheral side (outer peripheral connector) from coil U6 to coil U1. Or, there are respective connections when there is passage from coil U1 to coil U2, and afterwards, by repeating the inner peripheral→outer peripheral sequence, there is passage through the inner peripheral side from coil U6 to coil U1.

When there is serial connection of the sequence from coil U1 to coil U2, coil U3 to coil U4, coil U5 to coil U6, and when there is parallel connection from coil U1, coil U4 and coil U4 and parallel connection from coil U2, coil U3, and coil U5, as shown in FIG. 6(b), the serial connections are respectively connected by passage through the inner peripheral side (inner peripheral connections), and the parallel connections are respectively connected by passage through the outer peripheral side (outer peripheral connections). Or, the serial connections are respectively connected through the outer peripheral side (outer peripheral connections), and the parallel connections are respectively connected through the inner peripheral side (inner peripheral connections).

Figure 7:
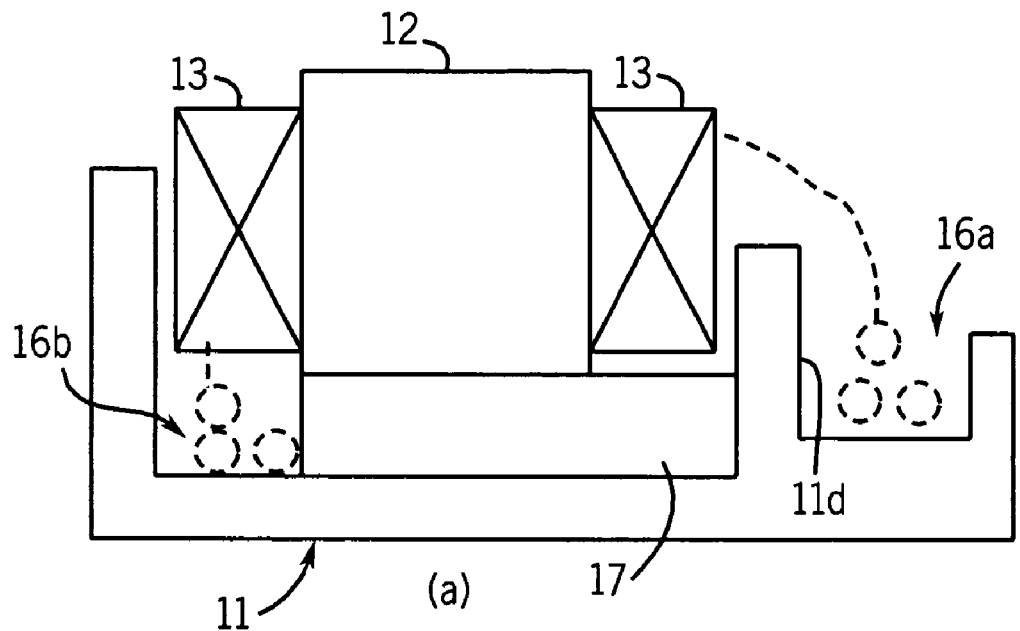
FIG. 7 illustrates the coil connection structure of Embodiment 5 of this invention, with (a) a cross-sectional example diagram for an odd number of coil stages, and (b) a cross-sectional example diagram for an even number of coil stages.
Figure 7:
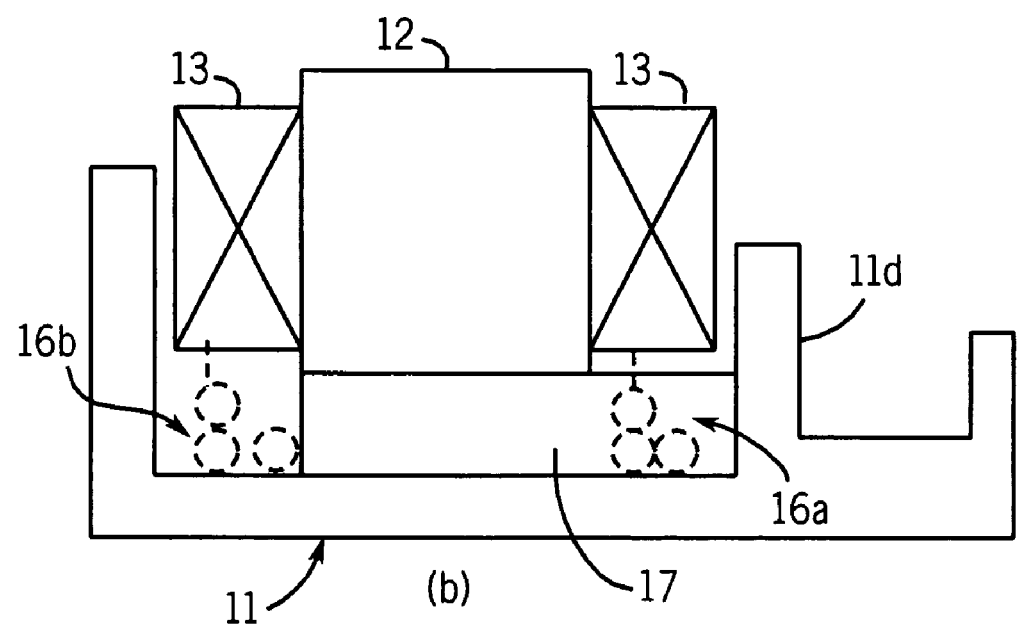

FIG. 7 shows the coil connection structure of Embodiment 5, with (a) as a cross-sectional explanation diagram for when the coil stage count is odd, and with (b) as a cross-sectional explanation diagram for when the coil stage count is even. The coil stage count is the layer count of the coil winding 13 which is wound as layers on the tooth 12. When the coil winding 13 is wound in 2 layers on the tooth 12, the coil stage count is 2.

As shown in FIG. 7, assuming that the stage count for every coil is odd, there is take-out from the rotor side (not illustrated) the end of the coil winding 13 of the stator core's inner peripheral side, that is, from the projection end side of the tooth 12. There is arrangement of the end connector 16a of the coil winding 13 of the stator core's inner peripheral side at intervals by the wall 11d which is used for cooling which is formed on the motor rotation axis side within the motor case 11. There is arranged the end connector 16b of the coil winding 13 of the stator core's outer peripheral side at intervals of the case outer peripheral surface within the motor case 11 and the back yoke 17, FIG. 7a.

In addition, assuming an even number for the stage count of each coil, there is take-out of the end of the coil winding 13 in both directions of the stator core's inner peripheral. side and stator core's outer peripheral side, that is, from the base of the tooth 12. There is arrangement of the end connector 16a of the coil winding 13 of the stator core's inner peripheral side at intervals of the wall 11d which is used for cooling inside the motor case 11 and the back yoke 17. There is arrangement of the end connector 16b of the coil winding 13 of the stator core's outer peripheral side at intervals of the case's outer peripheral side surface within the motor case 11 and the back yoke 17, FIG. 7b.

In this way, when there are respective connections of the coil winding from the top of the stator core's inner peripheral side and from the bottom of the stator core's outer peripheral side, the coil stage count is odd, but when there is connection from both the stator core's inner peripheral side and the stator core's outer peripheral side, the coil stage count is even. For the case where the coil is connected with the inner peripheral connector, from the effect of the cooling fin which is located on the stator core's inner peripheral side, space efficiency is improved, when the take-out of the coil winding is at the projection end of the teeth (stator side).

On the one hand, at the stator core's outer peripheral side, because the connector is below the coil, it is permissible to perform take-out of the coil winding from the base side of the teeth. If the coil stage count is odd, because the winding start and winding end become up and down, it is possible to satisfy the previously described conditions. The effect is to be able to miniaturize the entire motor by doing away with space by miniaturizing the coil connectors.

In this case, by starting the winding of the coil winding from the outer peripheral side, because it is possible to place the end on the outer peripheral side, there is improvement in connection operability with the outer peripheral busbars.

Moreover, in the embodiment, there was an explanation using a 3-phase motor, but the phase count is not limited to this number, and this invention is appropriate for motors with phase counts greater than three phases.

Various embodiments of the invention have been described. These and other embodiments are within the scope of the following claims.

The inventor claimed is:
1. A motor comprising:
a rotor comprising a plurality of permanent magnet;
a stator opposed to the rotor and having a plurality of stator cores formed in an annulus;
a plurality of coils with each of the coils being wound around a respective one of the stator cores, each of the coils having an outer peripheral coil wound end disposed on an outer peripheral side of the stator cores and an inner peripheral wound end on an inner peripheral side of the stator cores;

a plurality of outer peripheral connectors connecting the outer peripheral coil wound ends via the outer peripheral side of the stator cores; and a plurality of inner peripheral connectors that connect the inner peripheral coil wound ends via the inner peripheral side of the stator cores, at least three of the coils being serially connected by alternating outer and inner peripheral connectors.

2. The motor of claim 1, wherein
one of the outer peripheral connectors and one of the inner peripheral connectors are associated with one of a plurality of phases of the coils.

3. The motor of claim 1, wherein
the inner peripheral coil wound ends are disposed at a protruding end of one of the stator cores, and wherein the outer peripheral coil wound ends are disposed at a base of one of the stator cores.

4. The motor of claim 3, wherein
the coils are wound from the inner peripheral side of one of the stator cores.

5. The motor of claim 1, wherein
the coils comprise an odd number of stages.

6. A motor comprising:
a rotor comprising a plurality of permanent magnets;
a stator comprising a plurality of stator cores adjacent to a periphery of the stator;
means for conducting an electrical current around the stator cores, the means for conducting an electrical current comprising a plurality of coils with outer peripheral coil wound ends disposed on an outer peripheral side of the stator cores and inner peripheral coil wound ends disposed on an inner peripheral side of the stator cores;
outer means for connecting the outer peripheral coil wound ends at the outer peripheral side of the stator cores; and
inner means for connecting the inner peripheral coil wound ends at the inner peripheral side of the stator cores,
at least three of the coils being serially connected by alternating the outer and the inner means for connecting.

7. The motor of claim 6, wherein
the means for connecting the outer peripheral coil wound ends and the means for connecting the inner peripheral coil wound ends are associated with one of a plurality of phases of the means for conducting an electrical current.

8. The motor of claim 6, wherein
the means for conducting an electrical current is wound from the inner peripheral side of one of the stator cores.

9. The motor of claim 6, wherein
the inner peripheral coil wound ends are disposed at a protruding end of one of the stator cores, and wherein the outer peripheral coil wound ends are disposed at a base of one of the stator cores.

10. The motor of claim 6, wherein
the means for conducting an electrical current comprises an odd number of stages.

11. A motor comprising:
a motor case that allows a rotor axis to rotate within the motor case; a rotor attached to the rotor axis, wherein
the rotor comprises a plurality of permanent magnets disposed along a periphery of the rotor;
a stator opposed to the rotor within the motor case;
a plurality of coils disposed along a periphery of the stator;
a plurality of stator cores formed in an annulus, wherein
the coils comprise outer peripheral coil wound ends disposed on an outer peripheral side of the stator cores and inner peripheral coil wound ends on an inner peripheral side of the stator cores;
a plurality of outer peripheral connectors that connect the outer peripheral coil wound ends via the outer peripheral side of the stator cores; and
a plurality of inner peripheral connectors that connect the inner peripheral coil wound ends via the inner peripheral side of the stator cores,
at least three of the coils being serially connected by alternating outer peripheral connectors and inner peripheral connectors.

12. The motor of claim 11, wherein
the coils conduct an electrical current in three phases, wherein
each phase is associated with one of the outer peripheral connectors and one of the inner peripheral connectors.

13. The motor of claim 11, wherein
the inner peripheral coil wound ends are disposed at a protruding end of one of the stator cores, and wherein the outer peripheral coil wound ends are disposed at a base of one of the stator cores.

* * * * *